A. C. HARRISON.
SIFTER FOR TREATING POTTERS' SLIP, POWDERED SUBSTANCES, AND THE LIKE.
APPLICATION FILED APR. 29, 1919. RENEWED MAY 4, 1920.

1,346,452.

Patented July 13, 1920.

3 SHEETS—SHEET 1.

Inventor:
Arthur C. Harrison,
by Thos. Ackerman
atty.

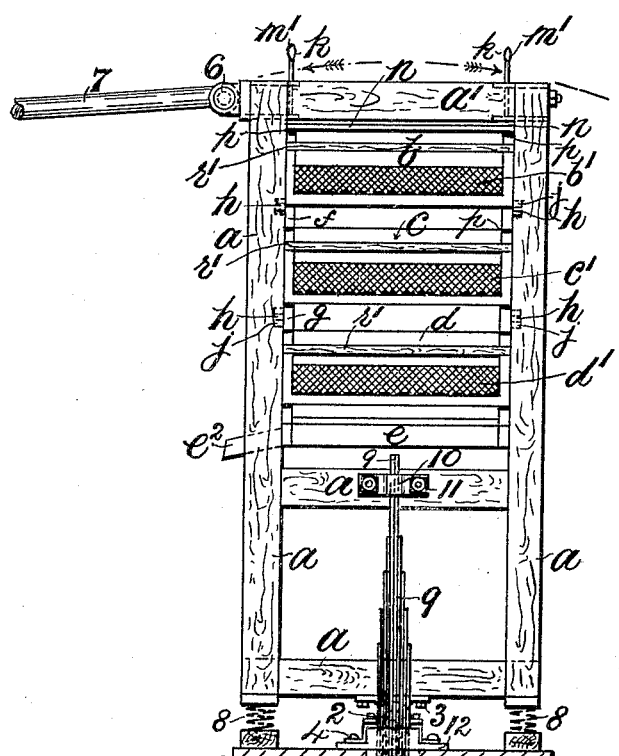
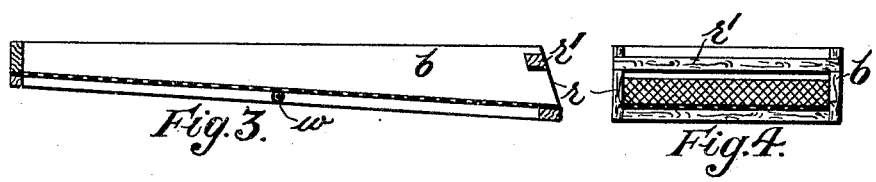
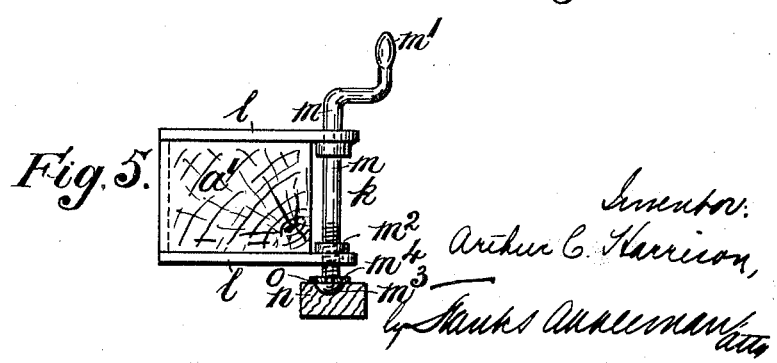

UNITED STATES PATENT OFFICE.

ARTHUR CECIL HARRISON, OF ALSAGER, ENGLAND.

SIFTER FOR TREATING POTTERS' SLIP, POWDERED SUBSTANCES, AND THE LIKE.

1,346,452.     Specification of Letters Patent.     Patented July 13, 1920.

Application filed April 29, 1919. Serial No. 293,562. Renewed May 4, 1920. Serial No. 380,016.

*To all whom it may concern:*

Be it known that I, ARTHUR CECIL HARRISON, subject of the King of Great Britain and Ireland, and resident of Field House, Alsager, in the county of Cheshire, England, manufacturer, have invented certain new and useful Improvements in Sifters for Treating Potters' Slip, Powdered Substances, and the like, of which the following is a specification.

My invention relates to improvements in sifters for treating potters' slip, powdered substances and the like, the object being to provide an improved machine of simple construction and one which can be driven at a high speed without the necessity of a rigid or expensive framework often required to withstand the vibration usually created in sifting apparatus, further objects being means whereby the slip or other material is expeditiously and thoroughly sifted, and means for enabling each of the lawn frames to be easily removed examined and washed when necessary.

With the aforesaid objects in view my invention consists essentially in providing a sifting machine constructed in the form of a skeleton frame and having a series of detachable or interchangeable lawn frames placed one above the other with a tray or collecting box underneath the lowermost sieve for the finely sifted or finished slip to pass into the said frame, carrying the lawn frames, oscillating or vibrating on a fixed center or shaft arranged longitudinally and midway of the width of the frame, and one or more springs connected to each end of the movable frame and also to a fixed foundation, beam, or other suitable structure independent of the rocking frame but in close proximity thereto, so that the springs yield to the oscillation or vibration but always tend to maintain the frame in an upright position.

Figure 1:
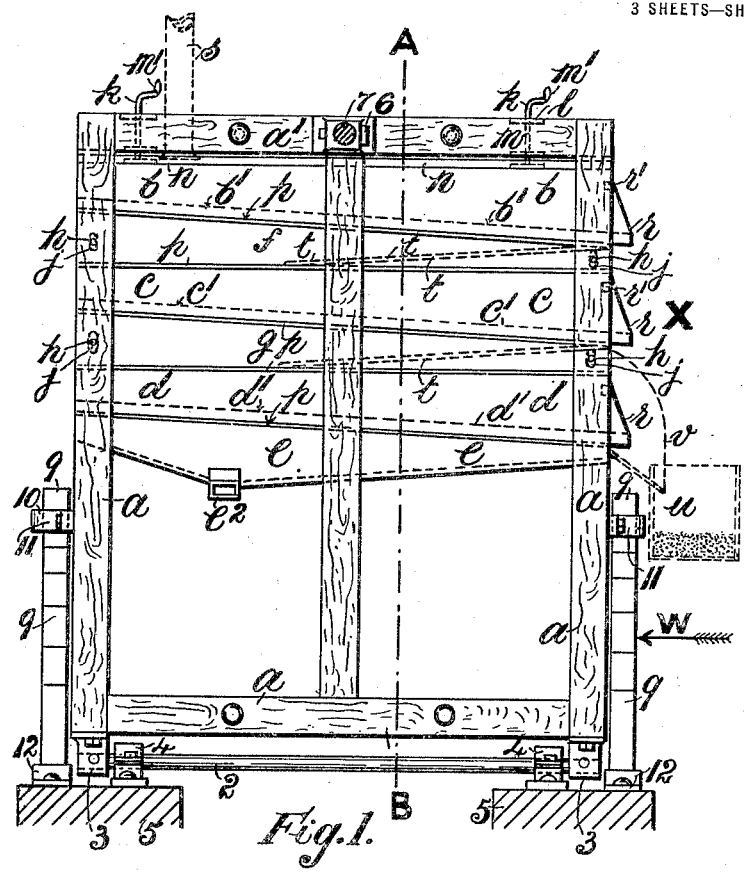
Figure 6:
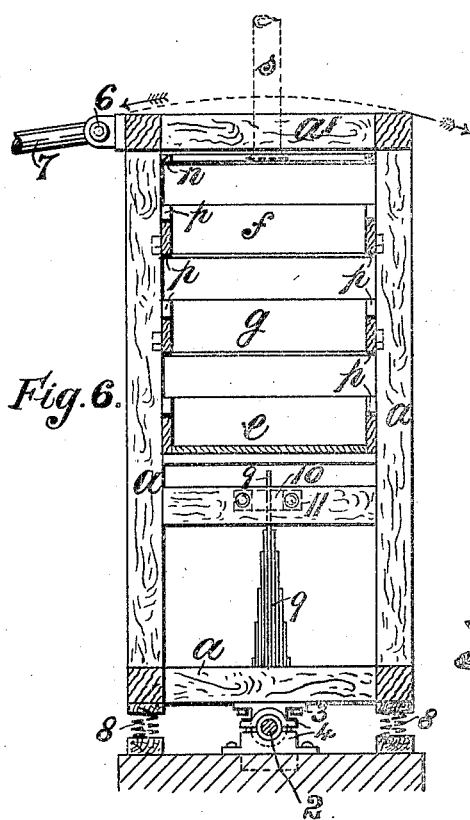
Figure 9:
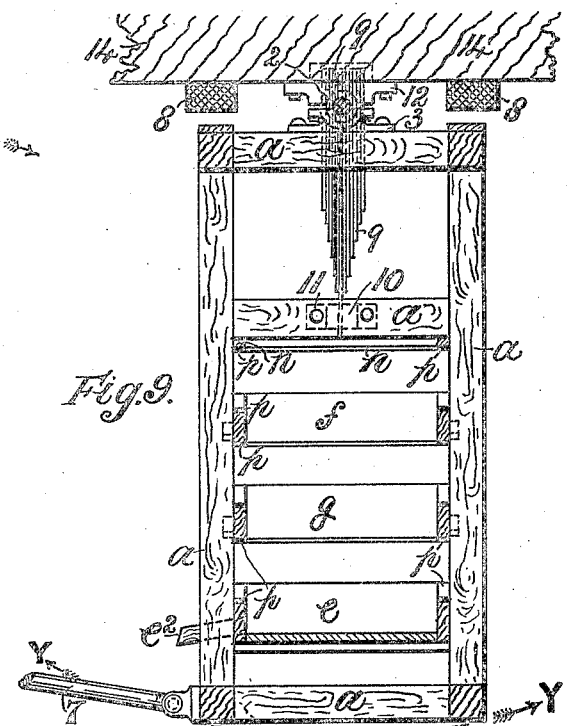
Figure 7:
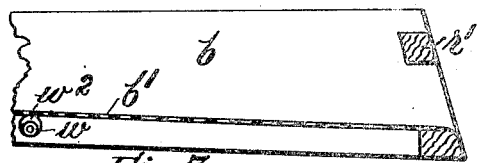
Figure 8:
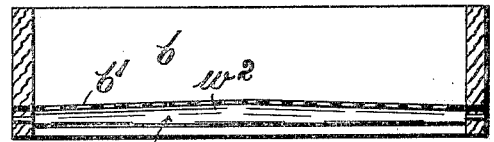

My invention will be fully described with reference to the accompanying drawings in which, Figure 1 is a front elevation of a sifting machine constructed in accordance with my invention, Fig. 2 is an end elevation as seen in the direction of the arrow W of Fig. 1, Figs. 3 and 4 are sectional elevation and end elevation respectively of one of the lawn frames, Fig. 5 is an enlarged detail of a clamping device to be hereinafter described, Fig. 6 is a cross section through line A—B of Fig. 1, the lawn frames having been removed to make the other parts more clear, Figs. 7 and 8 are part sectional elevation and cross section respectively of one of the lawn frames, these two views being drawn to a larger scale, and Fig. 9 is a cross section with the lawn frames removed, of a modification of my invention to be hereinafter described.

In accordance with my invention I construct the frame $a$ rectangular in cross section and of suitable size to support a series of lawn frames $b$ $c$ and $d$ of a tapering character and placed one above the other as shown at Figs. 1 and 2, the uppermost sieve $b$ of the series having a lawn $b^1$ of large mesh while the lower sieve has a lawn $d^1$ of finer mesh to complete the sifting of the slip before it enters the collecting box $e$. The collecting box $e$ having a discharge outlet at $e^2$ is fixed to the frame $a$ and forms the lower bearer or support for the lowermost lawn frame $d$, other bearers $f$ and $g$ being employed between the detachable lawn frames, these bearers being controlled by pins or projections $h$ engaging slots $j$ in the frame $a$ or in a plate fixed thereon, the said slots allowing the bearers $f$ and $g$ to slightly rise when the lawn frames are being slid in position from the end X of the machine and to allow all the lawn frames and their bearers to be clamped tightly together by suitable clamping devices such as, for example, shown at $k$. Each clamping device $k$ (four in number) is arranged near each end at the top of the frame $a$ and consists of a screwed rod $m$ passing through a screwed hole $m^2$ in a bracket $l$ secured to the top member $a^1$ of the frame. The end $m^3$ of the rod is connected to a clamping bar $n$ by a plate $o$ fixed to the bar and engaging a neck or reduced portion $m^4$ on the rod $m$. When the screwed rod $m$ is rotated by the handle $m^1$ the clamping bar $n$ takes against the top edge of the upper lawn frame $b$ and forces all the lawn frames and bearers tightly together, the pins $h$ and slots $j$ hereinbefore referred to allowing the bearers $g$ and $f$ to move downward. Strips of flannel or the like material $p$ are secured to the top and bottom edges of each bearer to make a close joint with the lawn frames.

The detachable or interchangeable lawn frames are of a tapering character with inclined lawns $b^1$ $c^1$ $d^1$, the frames being open at their projecting ends $r$, and having a cross stay $r^1$ serving as a handle which enables them to be readily withdrawn and placed in position again as desired.

In order to take up the slack of the lawn stretched across the base of each lawn frame (see sections at Figs. 3, 7 and 8) I employ an eccentrically mounted roller $w$ extending transversely of the lawn frame, the said roller being covered with flannel or other suitable fabric. To tighten the lawn or other sifting medum the roller $w$ is partly rotated, the swell $w^2$ on the roller taking against the lawn as shown at Fig. 8.

The slip is supplied to the machine through the pipe $s$ (shown dotted at Fig. 1) on to the top inclined lawn $b^1$ through which it passes, being directed to the top end of the next lawn $c^1$ by an oppositely inclinel partition $t$ the slip being conveyed through all the lawns in precisely the same way, and collected in a receiver or box $e$ arranged under the lowermost lawn frame $d^1$. The coarser particles, or tailings, of the slip gradually work their way off the lawns and over the open projecting ends $r$ of the lawn frames into a receptacle $u$, a suitable guard or chute $v$ being employed to assist its direction. By this means the slip is thoroughly sifted and the coarser particles are separated therefrom and collected during the oscillatory or vibratory motion of the sifter. If desired the guard $v$ may extend vertically in front of all the sieves and may be closed up when the machine is sifting by a hinged door, detachable apron, or strip of fabric.

An important feature of my invention is the combined means I employ for obtaining an oscillatory or vibratory and shaking motion to the machine, the particular motion obtained being essential to thoroughly and expeditiously sift the slip. This is accomplished by mounting the whole frame of the machine carrying the lawn frames on a center which may be in the form of a rod or shaft 2 arranged longitudinally and midway of the width of the frame, the said shaft 2 being secured to the skeleton frame $a$ by brackets 3, bearings 4 secured to a foundation 5 being employed for the shaft 2 to move in. Hinged to the upper end of the machine at 6 (see Figs. 1, 2 and 6) is a connecting rod 7 receiving a to and fro motion from an eccentric, cam, crank on a driven shaft or by other suitable means causing the machine to rock or swing sidewise on the center 2, spring, rubber or other buffers 8 being employed at each corner of the frame if desired. Arranged at each end of the machine and opposite the ends of the longitudinal shaft 2 is a spring 9 composed of a number of flat spring plates of varying height as shown at Fig. 2. The upper end of each spring 9 is secured to the machine frame at 10 by means of a bracket 11, the lower end of each spring 9 being secured, by means of a bracket 12 to a suitable foundation 5. These springs 9 are normally vertical but yield or bend and work in unison with the rocking or shaking action of the machine.

Fig. 9 is a cross section of a modification of my invention the lawn frames having been removed therefrom to clearly show the position of the bearers $f$ and $g$ and the collecting box or receptacle $e$. In this case the bearers $g$ and $f$ and lawn frames are placed lower down and the center or fulcrum 2 is arranged on a suitable structure above the machine, say for example, on a beam 14, the connecting rod 7 being hinged to the lower member of the machine $a$. The spring 9 is connected to the frame $a$ and to the beam or structure 14, rubber buffers 8 being secured to the beam. The machine is swung to and fro on the center 2 in the direction of the arrows Y the springs 9 working therewith to produce the rocking and shaking action as before stated. The springs 9 always tend to force the machine into a vertical position, and this exertion in combination with the rocking action produces a shaking and vibratory action.

The machine is operated as follows:—The lawn frames $b$, $c$ and $d$ are slid in position over the bearers, the clamping devices $k$ are then operated to bind all the lawn frames and bearers together. The machine is then set in action and a supply of slip is passed through the pipe $s$ on to the top lawn $b^1$ through which it passes and on to the other lawns $c^1$ and $d^1$ and into the box $e$ the slip then pasing through the opening $e^2$ to a trough or other conveyer which conveys it to a suitable place to be further treated. The coarser particles pass over the ends $r$ of each lawn frame into a receptacle $u$, the latter being detachable so as to be easily emptied and placed back again.

What I claim as my invention and desire to secure by Letters Patent is:—

1. In sifting machines, the combination with a skeleton frame and a fixed base, sieving elements supported on the frame, a shaft arranged longitudinally of the frame and disposed intermediate the width thereof, of spring members connected to the frame and fixed base, and means for rocking the frame on the shaft.

2. In a sifting machine, a stationary base, a shaft on the stationary base, a frame mounted to rock on said shaft, sieving elements on the frame, vertical leaf spring members positioned adjacent each end of the frame and having connection therewith, and means adapted to rock the frame on the shaft.

In testimony whereof I have hereunto set my hand in the presence of two witnesses.

ARTHUR CECIL HARRISON.

Witnesses:
J. BENTON,
PATTIE PLANT.